United States Patent
Cormier

[19]

[11] Patent Number: 5,947,613
[45] Date of Patent: Sep. 7, 1999

[54] BEARING AND WHEEL HUB RETENTION SYSTEM FOR WHEEL END ASSEMBLY

[75] Inventor: Paul L. Cormier, Plymouth, Mich.

[73] Assignee: Kelsey-Hayes Company, Livonia, Mich.

[21] Appl. No.: 09/080,578

[22] Filed: May 18, 1998

Related U.S. Application Data

[60] Provisional application No. 60/047,097, May 19, 1997.

[51] Int. Cl.$^6$ .............................. F16C 43/00; B60B 27/00
[52] U.S. Cl. ......................... 384/538; 384/544; 384/561; 384/563; 384/903; 301/35.63; 301/122
[58] Field of Search ..................................... 384/537, 538, 384/539, 544, 559, 561, 563, 569, 570, 571, 583, 584, 585, 589, 517, 903; 403/261; 301/35.63, 122

[56] References Cited

U.S. PATENT DOCUMENTS

| | | | |
|---|---|---|---|
| 3,583,511 | 6/1971 | Asberg | 384/544 X |
| 4,083,613 | 4/1978 | McGee | 384/585 |
| 5,226,738 | 7/1993 | Valette et al. | 384/544 X |
| 5,597,242 | 1/1997 | Beeler | 384/538 X |

*Primary Examiner*—Thomas R. Hannon
*Attorney, Agent, or Firm*—MacMillan, Sobanski & Todd, LLC

[57] ABSTRACT

A bearing and wheel hub retention system adapted for use in a wheel end assembly includes a spindle, a wheel hub adapted to be supported and connected to the spindle for rotation therewith, a bearing assembly adapted to rotatably support the spindle and the wheel hub relative thereto, and a collar. The spindle is provided with an annular groove formed in an outer surface thereof. The groove includes a pair of opposed side walls and a base wall. At least one of the side walls of the groove is an angled side wall. The collar is disposed in the groove of the spindle, and includes at least one angled side wall which cooperates with the angled side wall of the groove so as to produce a ramp like action which is operative to secure the spindle and the wheel hub together and also to preload the bearing assembly to a predetermined preload.

20 Claims, 7 Drawing Sheets

BEARING AND WHEEL HUB RETENTION SYSTEM FOR WHEEL END ASSEMBLY

CROSS-REFERENCE TO RELATED APPLICATIONS

This application claims the benefit of U.S. Provisional Application Ser. No. 60/047,097, filed May 19, 1997.

BACKGROUND OF THE INVENTION

This invention relates in general to a vehicle wheel end assembly and in particular to an improved structure for a bearing and wheel hub retention system for use in such a vehicle wheel end assembly.

Figure 1:
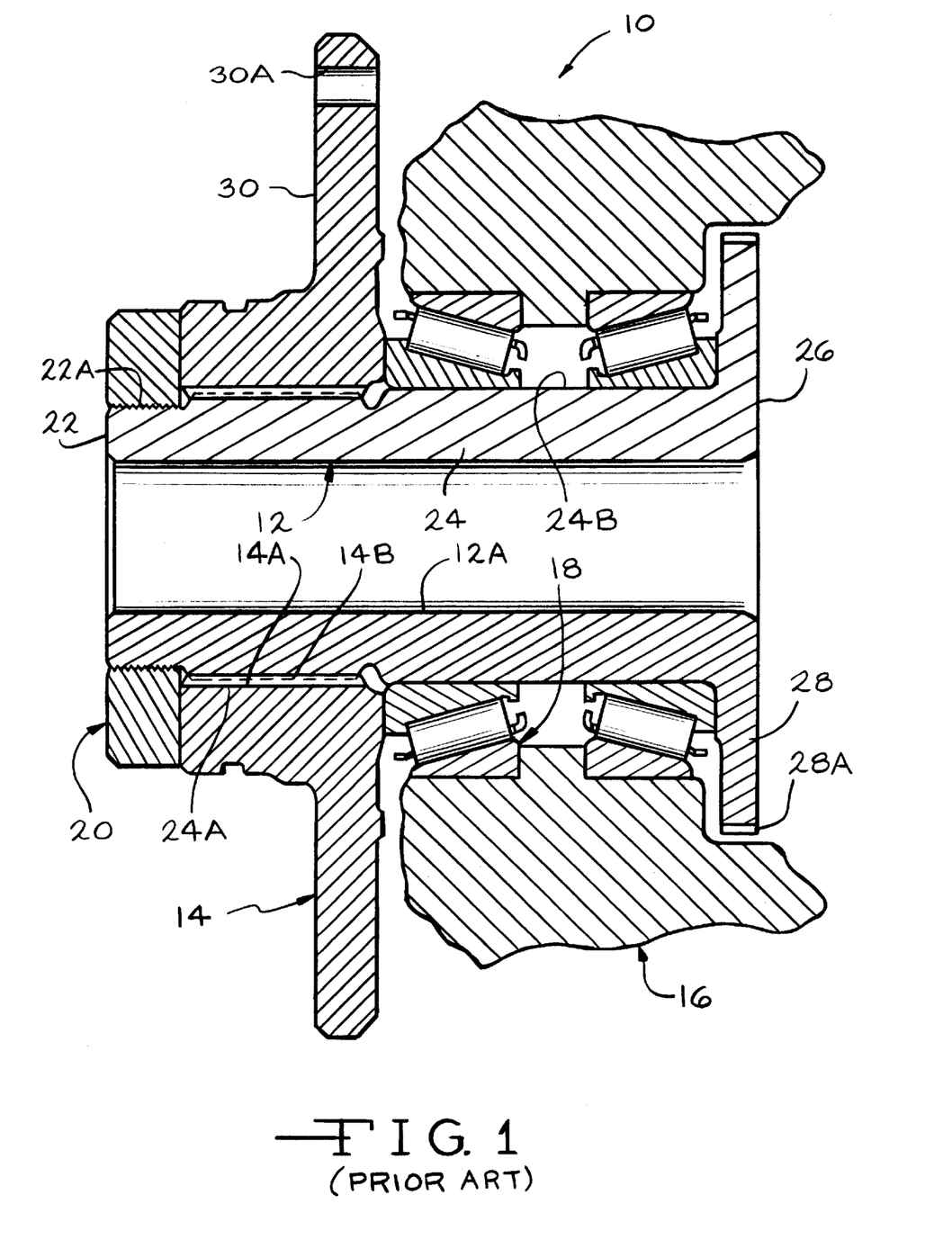
FIG. 1 is a sectional view of a portion of a prior art wheel end assembly including a conventional bearing and wheel hub retention system.

One example of a known vehicle wheel end assembly, indicated generally at 10, is illustrated in prior art FIG. 1. As shown therein, the prior art wheel end assembly 10 is associated with a driven front wheel of a vehicle and includes a spindle 12, a wheel hub 14, a steering knuckle, 16, a bearing assembly 18, and a spanner nut 20. The spindle 12 includes an outer end 22 having external threads 22A along a portion thereof, a body 24 having external splines 24A along a portion thereof and defining a bearing seat 24B, and an inner end 26 having a generally radially outwardly extending flange 28.

The bearing seat 24B of the spindle 12 is adapted to support the bearing assembly 18 which is in turn, secured to a non-rotatable component of the vehicle, which in this case is the steering knuckle 16, so as to rotatably support the spindle 12 and the wheel hub 14 relative thereto. The flange 28 of the spindle 12 includes external teeth 28A which are adapted to be selectively coupled to a driven shaft (not shown) for 4×4 applications. Alternatively, an internal bore 12A of the spindle 12 can include internal splines (not shown) for receiving mating external splines provided on an axle (not shown) for rotatably connecting the spindle 12 to the axle for rotation therewith. In addition, in a non-driven wheel application, the spindle 12 may not include the internal bore 12A.

The wheel hub 14 includes an internal bore 14A having internal splines 14B which matingly receive the external splines 24A of the spindle 12 for connecting the wheel hub 14 to the spindle 12 for rotation therewith. The wheel hub 14 also includes a generally radially outwardly extending flange 30. The flange 30 includes a plurality of circumferentially spaced stud receiving holes 30A formed therein (only one of such stud receiving holes 30A is illustrated in prior art FIG. 1). The stud receiving holes 30A are adapted to receive studs (not shown) and nuts (not shown) for securing a rotatable brake component, such as for example a brake rotor (not shown) or a brake drum (not shown), and a vehicle wheel (not shown), to the wheel hub 14 for rotation therewith.

To secure the spindle 12 and the wheel hub 14 together for rotation with one another and also to preload the bearing assembly 20, the spanner nut 20 is installed on the threaded outer end 22 of the spindle 12 and tightened to a predetermined torque in order to exert a predetermined clamp load on the bearing assembly 18.

The prior art vehicle wheel end assembly 10 is subjected to various loads during vehicle operation. Typically, the loads which the prior art vehicle wheel end assembly 10 is subjected to include radial loads, bending loads, and torsional loads. Depending on the magnitude of the associated loads and the rotational motion of the associated wheel hub 12 during vehicle operation, the spanner nut 20 can rotate and loosen from its installed position resulting in the loss of the preset bearing preload. Thus, it would be desirable to provide an improved structure for a bearing and wheel hub retention system for a wheel end assembly which improves the retention of the bearing assembly on the wheel hub in order to maintain a preset bearing preload and yet is simple and inexpensive.

SUMMARY OF THE INVENTION

This invention relates to an improved bearing and wheel hub retention system adapted for use in a wheel end assembly. The bearing and wheel hub retention system includes a spindle, a wheel hub adapted to be supported and connected to the spindle for rotation therewith, a bearing assembly adapted to rotatably support the spindle and the wheel hub relative thereto, and a collar. The spindle is provided with an annular groove formed in an outer surface thereof. The groove includes a pair of opposed side walls and a base wall. At least one of the side walls of the groove is an angled side wall. The collar is disposed in the groove of the spindle, and includes at least one angled side wall which cooperates with the angled side wall of the groove so as to produce a ramp like action which is operative to secure the spindle and the wheel hub together and also to preload the bearing assembly to a predetermined preload.

Various objects and advantages of this invention will become apparent to those skilled in the art from the following detailed description of the preferred embodiment, when read in light of the accompanying drawings.

DETAILED DESCRIPTION OF THE PREFERRED EMBODIMENTS

Figure 2:
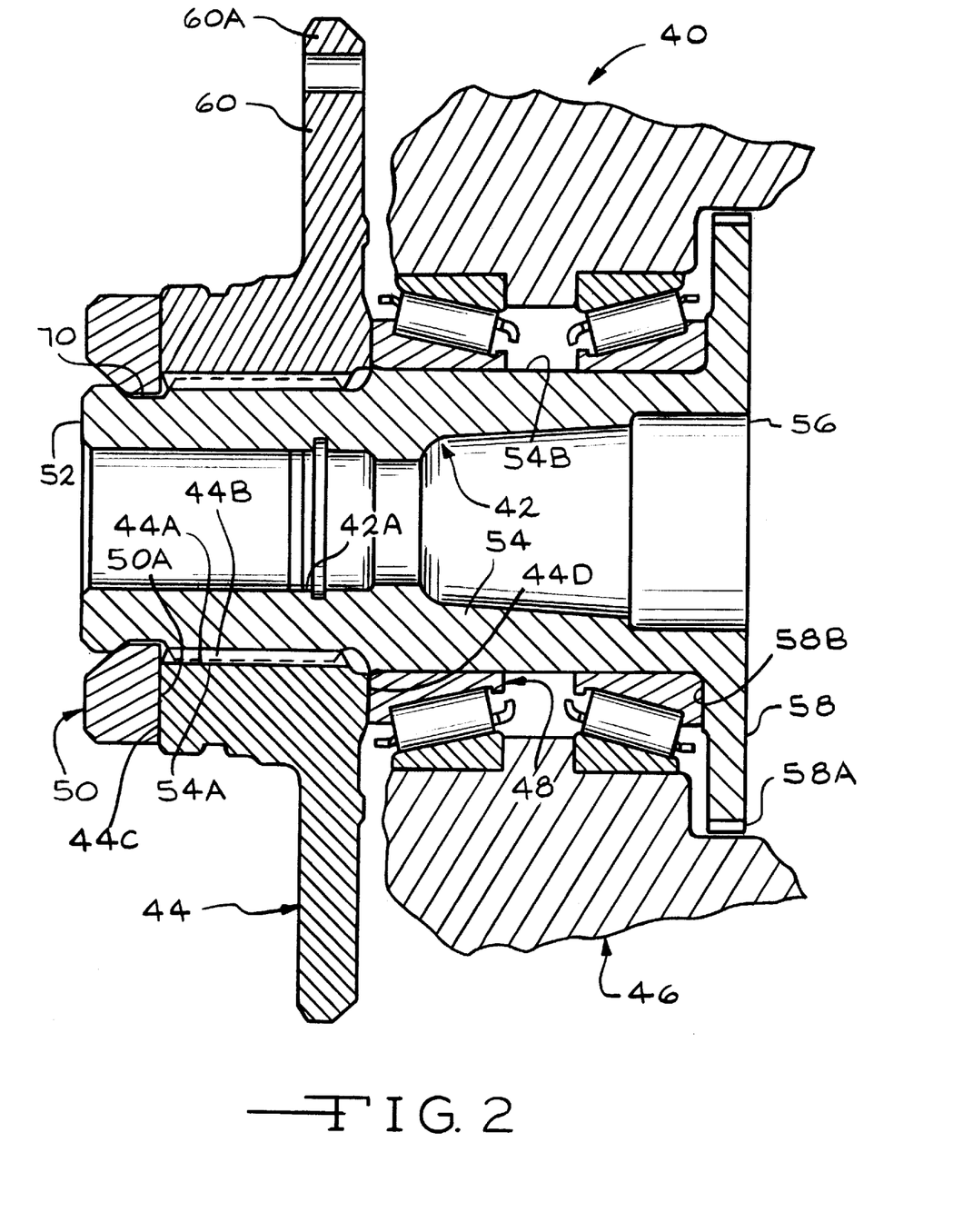
FIG. 2 is a sectional view of a portion of a wheel end assembly including a first embodiment of an improved bearing and wheel hub retention system in accordance with this invention.

Referring to the drawings, there is illustrated in FIG. 2 a wheel end assembly, indicated generally at 40, including a first embodiment of an improved bearing and wheel hub retention system in accordance with this invention. As shown therein, the wheel end assembly 40 includes a spindle 42, a wheel hub 44, a steering knuckle 46, a bearing assembly 48, and a collar 50. The spindle 42 includes an outer end 52 having an annular groove 70 formed therein, a body 54 having external splines 54A along a portion thereof and defining a bearing seat 54B, and an inner end 56 having a generally radially outwardly extending flange 58. As will be discussed, to secure the spindle 42 and the wheel hub 44 together for rotation with one another and also to preload the bearing assembly 48, the collar 50 is installed in the groove 70 to preload the bearing assembly 48 to a predetermined load.

The bearing seat 54B is adapted to support the bearing assembly 48 which is in turn, secured to a non-rotatable component of the vehicle, which in this case is illustrated as being the steering knuckle 46, so as to rotatably support the spindle 42 and the wheel hub 44 relative thereto. The flange 58 of the spindle 42 includes teeth 58A at the outer end thereof which are adapted to be selectively coupled to a driven shaft (not shown) for 4×4 applications. Alternatively, an internal bore 42A of the spindle 42 can include internal splines (not shown) for receiving mating external splines provided on an axle (not shown) for rotatably connecting the spindle 42 to the axle for rotation therewith. In addition, in a non-driven wheel application, the spindle 42 may not include the internal bore 42A.

The wheel hub 44 includes an internal bore 44A having internal splines 44B for receiving the mating external splines 54A of the spindle 42 for connecting the wheel hub 44 to the spindle 42 for rotation therewith. The wheel hub 44 also includes a generally radially outwardly extending flange 60. The flange 60 includes a plurality of circumferentially spaced stud receiving holes 60A formed therein (only one of such stud receiving holes 60A is illustrated in FIG. 2). The stud receiving holes 60A are adapted to receive studs (not shown) and nuts (not shown) for securing a rotatable brake component, such as for example a brake rotor (not shown) or a brake drum (not shown), and a vehicle wheel (not shown), to the wheel hub 44 for rotation therewith.

Figure 3:
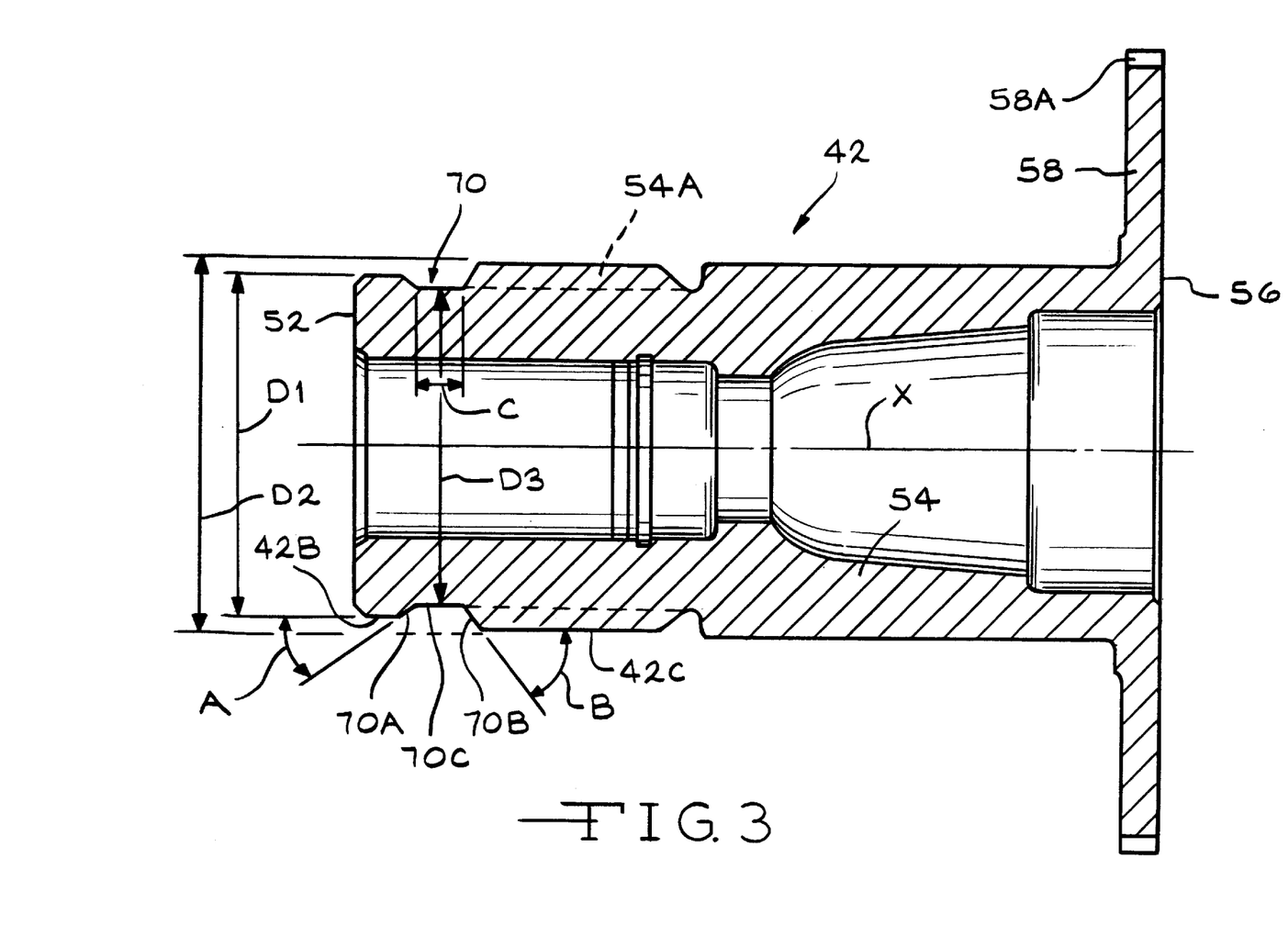
FIG. 3 is a sectional view of the spindle of the improved bearing and wheel hub retention system illustrated in FIG. 2.
Figure 4:
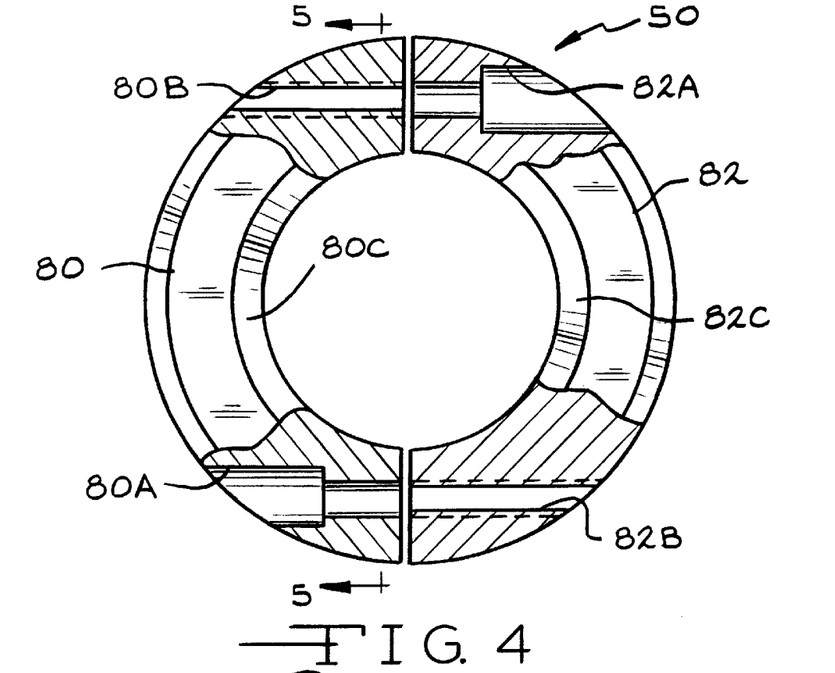
FIG. 4 is a view of a portion of the collar of the improved bearing and wheel hub retention system illustrated in FIG. 2.
Figure 5:
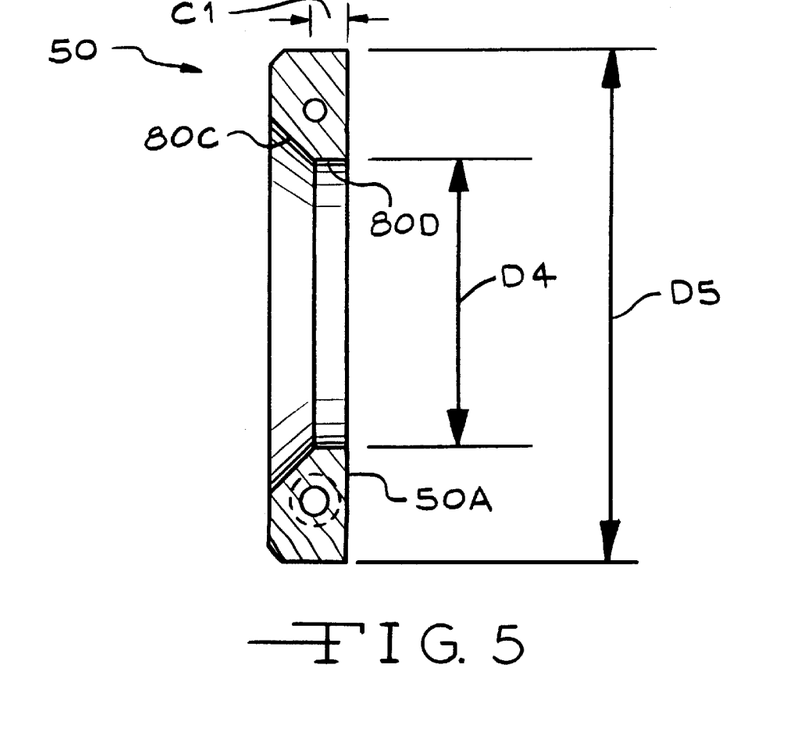
FIG. 5 is a sectional view of the collar taken along line 5—5 of FIG. 4.

Referring now to FIGS. 3–5, the wheel hub 42 and the collar 50 will be discussed in detail. As shown therein, the annular groove 70 is provided in an outer surface of the spindle 42 adjacent the outer end 52 thereof, and includes a pair of opposed angled side walls 70A and 70B, and a generally flat base wall 70C which is oriented generally parallel to an axis X of the spindle. The side wall 70A extends at a first predetermined angle A relative to an outer surface 42B of the spindle 42, and the side wall 70B extends at a second predetermined angle B relative to an outer surface 42C of the spindle 42. The first angle A is in the range from about 15° to about 65°, and the second angle B is in the range from about 15° to about 90°. In the illustrated embodiment, the first angle A is approximately 45° and the second angle B is approximately 45°.

The outer surface 42B defines a first spindle outer diameter D1 and the outer surface 42C defines a second spindle outer diameter D2 which is greater than the first spindle outer diameter D1. Alternatively, the outer surfaces 42B and 42C can define diameters other than illustrated if desired.

The base wall 70C of the groove 70 extends a predetermined axial distance C and defines a groove outer diameter D3 which is less than the first spindle outer diameter D2. In the illustrated embodiment, the outer surfaces 42B and 42C are generally parallel with one another and generally parallel with the axis X of the spindle 42, and the base wall 70C is generally parallel with the axis X of the spindle. Alternatively, one or more of the outer surfaces 42B and 42C and the base wall 70C can be other than illustrated if desired.

The collar 50 is of a two-piece design and includes a pair of identical halves 80 and 82. The collar 50 defines an collar inner diameter D4 and a collar outer diameter D5. The collar outer diameter D5 is greater than the spindle outer diameter D2 and preferably, for assembly purposes, the collar inner diameter D4 is slightly greater than the groove outer diameter D3. The collar half 80 includes a stepped non-threaded opening 80A, a threaded opening 80B, and a chamfered wall 80C formed along a portion of and extending generally radially outwardly from the collar inner diameter D4. Similarly, the collar half 82 includes a stepped non-threaded opening 82A, a threaded opening 82B, and a chamfered wall 82C formed along a portion of and extending generally radially outwardly from the collar inner diameter D4. The collar 50 includes a non-chamfered inner surface 80D which extends a predetermined axial distance C1 which is less than the axial distance C of the base wall 70C of the groove 70 for clearance purposes.

Figure 6:
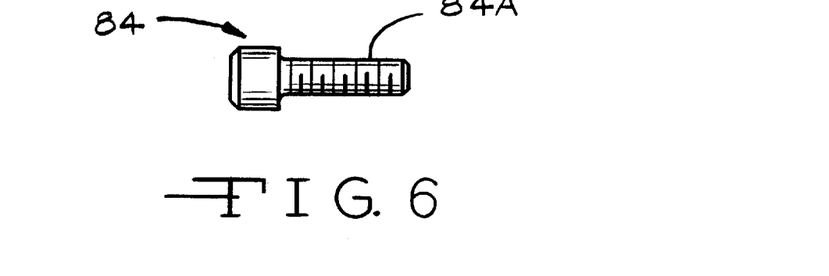
FIG. 6 is a view of a bolt which can be used with the collar illustrated in FIGS. 2–5.

To assemble and install and collar 50 on the spindle 42, the collar halves 80 and 82 are positioned in the groove 70 in the position shown in FIG. 4. A pair of threaded bolts 84, such as bolts 84 shown in FIG. 6, are inserted into the respective non-threaded openings 80A and 82A and threaded ends 84A of the bolts 84 are received in the respective threaded openings 80A and 82A of the collar halves 80 and 82. As the bolts 84 are tightened, the chamfered walls 80C and 82C of the respective collar halves 80 and 82 act as a cam or wedge against the angled side wall 70A of the groove 70 causing an inner side wall 50A of the collar 50 to engage and ramp down an outer side wall 44C of the wheel hub 44 and thereby axially move the wheel hub 44 gradually to the right in FIG. 2 (assuming that the spindle 42 is fixed and no movement thereof occurs). As a result, the wheel hub 44 is operative to compress the bearing assembly 48 between an inner side wall 44D thereof and an outer side wall 58B of the flange 58 of the spindle 42. The bolts 84 are further tightened so as to preload the bearing assembly 48 to a predetermined setting. As can be seen in FIG. 2, a slight space or gap preferably exists between the collar inner diameter D4 and the groove outer diameter D3 when the collar 50 is in its final installed position. Alternatively, other methods can be used to secure the collar halves 80 and 82 together. Preferably, such methods would allow removal of the collar 50 from the spindle 42. However, the collar halves 80 and 82 could be permanently secured together, such as by welding, if desired.

Figure 7:
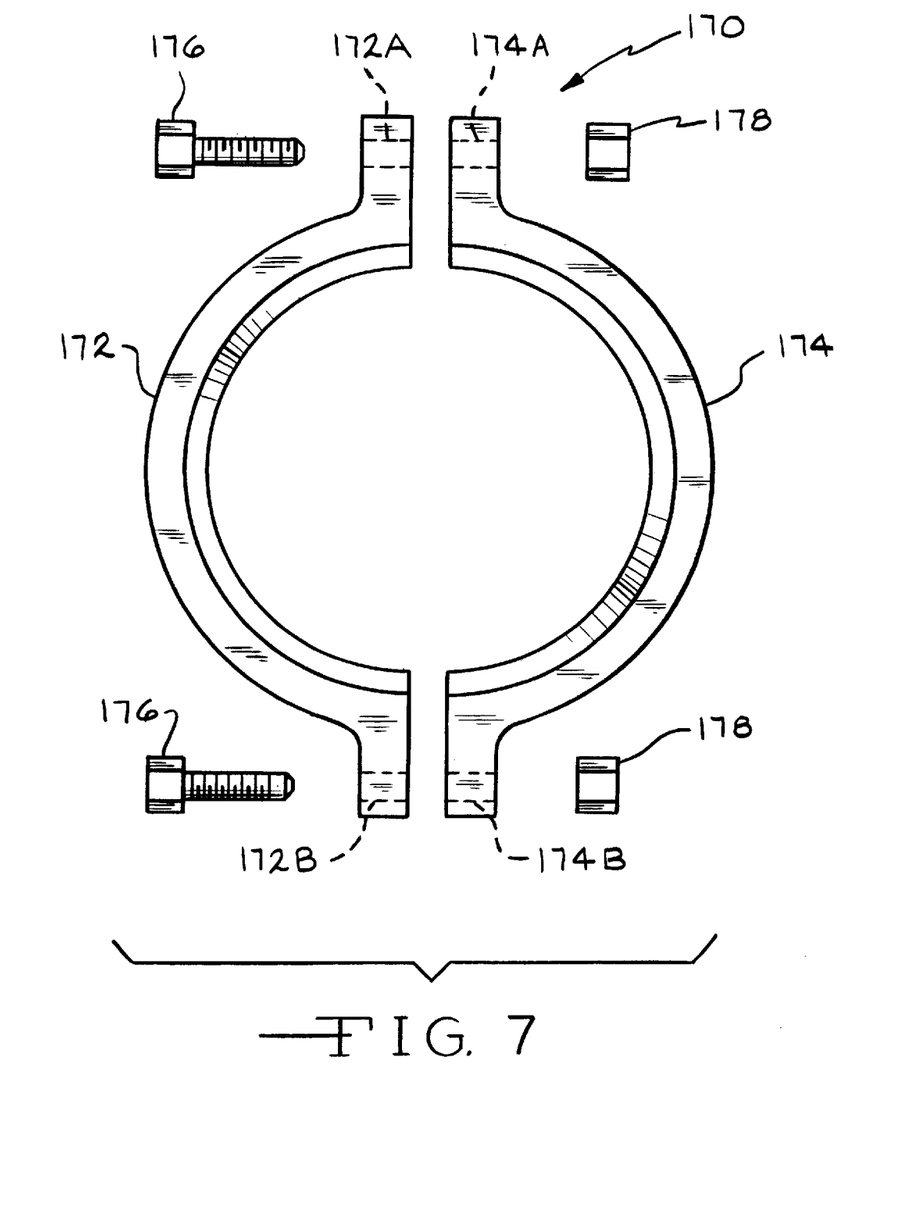
FIG. 7 is a view of a second embodiment of a collar which can be used with the improved bearing and wheel hub retention system of this invention.

FIG. 7 illustrates a second embodiment of a collar 170 in accordance with this invention. The collar 170 is of a two-piece design and includes identical halves 172 and 174. The collar half 172 includes a pair of non-threaded openings 172A and 172B formed therethrough. Similarly, the collar half 174 includes a pair of non-threaded openings 174A and 174B formed therethrough. A pair of threaded bolts 176 and nuts 178 are used to assemble and install the collar 170 on the spindle 42 in a manner similar to that described above in connection with the collar 50 shown in FIG. 2. Alternatively, other methods can be used to secure the collar halves 172 and 174 together. Preferably, such methods would allow removal of the collar 170 from the spindle. However, the collar halves 172 and 174 could be permanently secured together, such as by welding, if desired.

Figure 8:
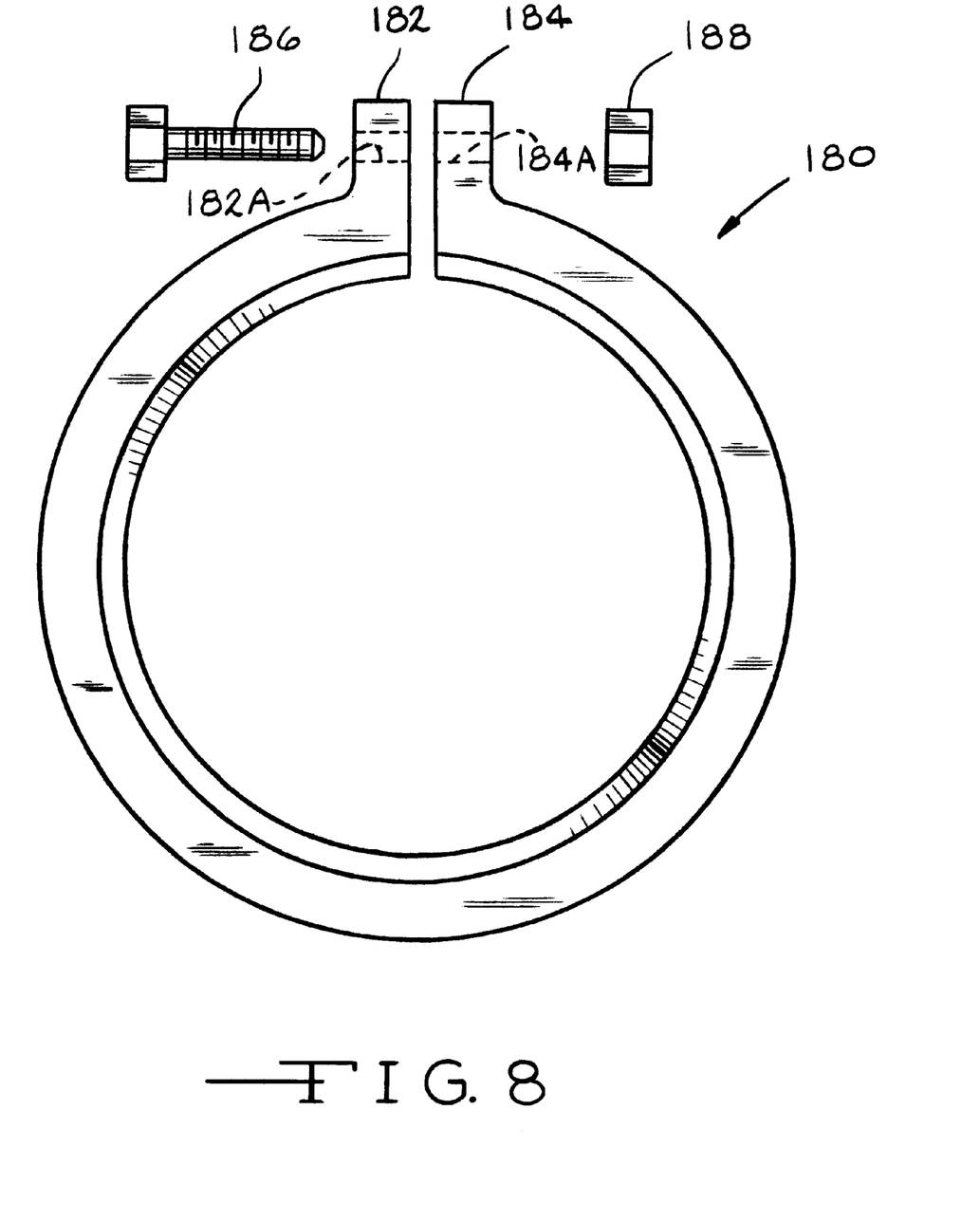
FIG. 8 is a view of a third embodiment of a collar which can be used with the improved bearing and wheel hub retention system of this invention.

FIG. 8 illustrates a third embodiment of a collar 180 in accordance with this invention. The collar 180 is of a one-piece or "split ring" design and includes opposed flange-like ends 182 and 184 having respective non-threaded openings 182A and 184A formed therethrough. A bolt 183 and a nut 84 are used to assemble and install the collar 180 on the spindle 42 in a manner similar to that described above in connection with the collar 50 shown in FIG. 2. Alternatively, other methods can be used to secure the flange-like ends 182 and 184 together. Preferably, such methods would allow removal of the collar 180 from the spindle. However, the ends 182 and 184 could be permanently secured together, such as by welding, if desired.

Figure 9:
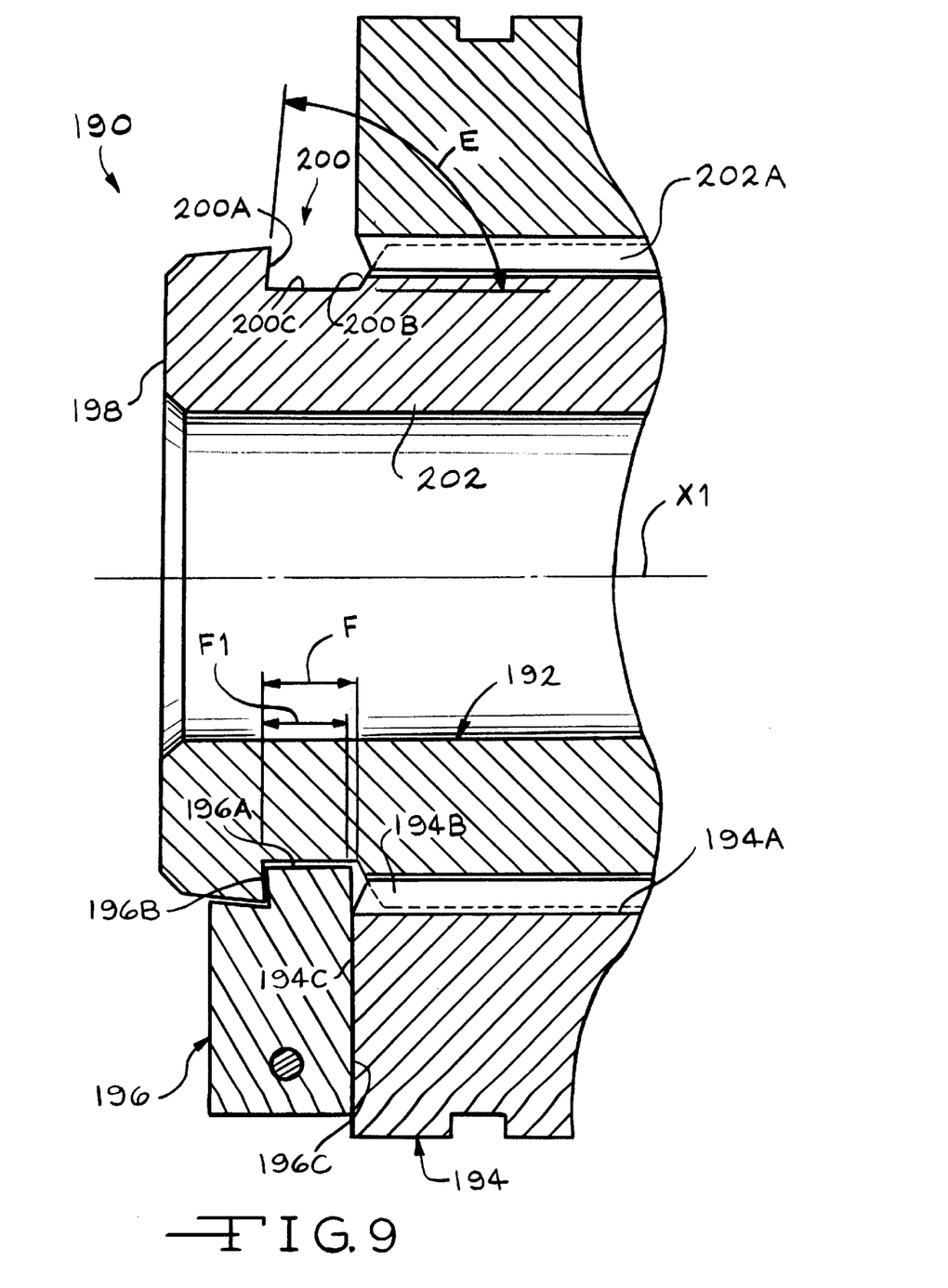
FIG. 9 is an enlarged view of a portion of a wheel end assembly including a second embodiment of an improved bearing and wheel hub retention system in accordance with this invention.

FIG. 9 illustrates a portion of another wheel end assembly, indicated generally at 190, and including a second embodiment of an improved bearing and wheel hub retention system in accordance with this invention. As shown therein, the wheel end assembly 190 includes a spindle 192, a wheel hub 194, and a collar 196. The spindle 192 includes an outer end 198 having an annular groove 200 formed therein, and a body 202 having external splines 202A along a portion thereof As will be discussed, to secure the spindle 192 and the wheel hub 194 together for rotation with one another and also to preload the bearing assembly (not shown), the collar 196 is installed in the groove 200 to preload the bearing assembly to a predetermined load. The wheel hub 194 includes an internal bore 194A having internal splines 194B for receiving the mating external splines 202A of the spindle 192 for connecting the wheel hub 194 to the spindle 192 for rotation therewith.

As shown in the upper portion of FIG. 9, the annular groove 200 is provided in an outer surface of the spindle 192 adjacent the outer end 198 thereof, and includes a pair of angled side walls 200A and 200B, and a generally flat base wall 200C which is oriented generally parallel to an axis X1 of the spindle. The side wall 200A extends at a predetermined angle E relative to the base wall 200C. The angle E is in the range from about 85° to about 89°. The base wall 200C of the groove 200 extends a predetermined axial distance F which is greater than an axial distance F1 defined by an inner surface 196A of the collar 196.

The collar 196 can be of a two-piece design, generally similar to the collar 50 and 170 discussed above, or of a one-piece design, generally similar to the collar 180 discussed above. The collar 196 includes a chamfered wall 196B and an inner side wall 196C.

To assemble and install and collar 196 on the spindle 192, the collar 196 is initially positioned in the groove 200 and one or more bolts and/or nuts are used in a manner described above. Due to the configuration of the collar 196 and the groove 200, initially, as the collar 196 is installed in the groove 200, the inner wall 196C of the collar 196 engages an outer wall 194C of the wheel hub 194 so as to slightly compresses and force the wheel hub 194 against the bearing assembly (i.e., move the wheel hub 194 to the right in FIG. 9), thereby causing a slightly greater than desired bearing preload. However, as the bolt (or bolts) are tightened, the chamfered wall 196B of the collar 196 ramps down against the angled side wall 200A of the groove 200 thereby allowing slight movement of the collar 196, and therefore the wheel hub 194, to the left in FIG. 9 to relieve a portion of the initially applied compressive force whereby a desired bearing preload is obtained.

One advantage of this invention is that the bearing and wheel hub retention systems of this invention are effective to maintain the preset bearing load. In particular, during vehicle cornering, the bearing and wheel hub retention systems of this invention allow angular movement of the wheel end assembly while maintaining the preset bearing load. In the prior art bearing and wheel hub retention system shown in FIG. 1, during vehicle cornering, the collar 20 can try to loosen or tighten depending upon the rotation of the wheel thereby affecting the preset bearing load.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A bearing and wheel hub retention system adapted for use in a wheel end assembly comprising:

a spindle defining a spindle axis and having an outer end, said spindle provided with an annular groove formed in an outer surface thereof adjacent said outer end, said groove including a pair of opposed side walls and a base wall, at least one of said side walls being an angled side wall;

a wheel hub adapted to be supported and connected to said spindle for rotation therewith;

a bearing assembly adapted to rotatably support said spindle and said wheel hub relative thereto; and a collar disposed in said groove of said spindle, said collar including at least one angled side wall which cooperates with said angled side wall of said groove so as to produce a ramp like action which is operative to secure said spindle and wheel hub together and also to preload said bearing assembly to a predetermined preload.

2. The bearing and wheel hub retention system defined in claim 1 wherein said groove includes a pair of opposed angled side walls and a generally flat base wall which is oriented generally parallel to said spindle axis.

3. The bearing and wheel hub retention system defined in claim 1 wherein said collar is of a two-piece design.

4. The bearing and wheel hub retention system defined in claim 3 wherein said collar includes a pair of identical halves.

5. The bearing and wheel hub retention system defined in claim 4 wherein each of said collar halves is provided with a pair of openings formed therethrough.

6. The bearing and wheel hub retention system defined in claim 1 wherein groove defines a groove outer diameter, said collar defines a collar inner diameter which is slightly greater than said spindle outer diameter.

7. The bearing and wheel hub retention system defined in claim 1 wherein said collar is of a one-piece design.

8. The bearing and wheel hub retention system defined in claim 7 wherein said collar includes opposed flange-like ends having respective openings formed therethrough.

9. The bearing and wheel hub retention system defined in claim 1 wherein said angled side wall of said collar cooperates with said angled side wall of said groove to produce a ramp like action during assembly which is operative to move said wheel hub toward said bearing assembly so as to apply a gradually increasing force to said bearing assembly thereby effecting said predetermined preload to said bearing assembly.

10. The bearing and wheel hub retention system defined in claim 1 wherein said angled side wall of said collar cooperates with said angled side wall of said groove to produce a ramp like action which during assembly is operative to initially move said wheel hub toward said bearing assembly and apply a first force to said bearing assembly which is slightly greater than said predetermined preload, and subsequently allows said wheel hub to move in an opposite direction away from said bearing assembly thereby allowing a gradual reduction of said first force until said collar is in a desired installed position whereby said predetermined preload of said bearing assembly is obtained.

11. A bearing and wheel hub retention system adapted for use in a wheel end assembly comprising:

a spindle defining a spindle axis and having an outer end, said spindle provided with an annular groove formed in an outer surface thereof adjacent said outer end;

a wheel hub adapted to be supported and connected to said spindle for rotation therewith;

a bearing assembly adapted to rotatably support said spindle and said wheel hub relative thereto; and a non-threaded collar disposed in said groove of said spindle, said collar adapted to secure said spindle and wheel hub together and also to preload said bearing assembly to a predetermined preload.

12. The bearing and wheel hub retention system defined in claim 11 wherein said collar is of a two-piece design.

13. The bearing and wheel hub retention system defined in claim 12 wherein said collar includes a pair of identical halves.

14. The bearing and wheel hub retention system defined in claim 13 wherein each of said collar halves is provided with a pair of openings formed therethrough.

15. The bearing and wheel hub retention system defined in claim 11 wherein groove defines a groove outer diameter, said collar defines a collar inner diameter which is slightly greater than said spindle outer diameter.

16. The bearing and wheel hub retention system defined in claim 11 wherein said collar is of a one-piece design.

17. The bearing and wheel hub retention system defined in claim 16 wherein said collar includes opposed flange-like ends having respective openings formed therethrough.

18. The bearing and wheel hub retention system defined in claim 11 wherein said non-threaded collar includes an angled side wall, said groove includes an angled side wall, and wherein said angled side wall of said collar cooperates with said angled side wall of said groove to produce a ramp like action during assembly which is operative to move said wheel hub toward said bearing assembly so as to apply a gradually increasing force to said bearing assembly thereby effecting said predetermined preload to said bearing assembly.

19. The bearing and wheel hub retention system defined in claim 11 wherein said non-threaded collar includes an angled side wall, said groove includes an angled side wall, and wherein said angled side wall of said collar cooperates with said angled side wall of said groove to produce a ramp like action which during assembly is operative to initially move said wheel hub toward said bearing assembly and apply a first force to said bearing assembly which is slightly greater than said predetermined preload, and subsequently allows said wheel hub to move in an opposite direction away from said bearing assembly thereby allowing a gradual reduction of said first force until said collar is in a desired installed position whereby said predetermined preload of said bearing assembly is obtained.

20. A bearing and wheel hub retention system adapted for use in a wheel end assembly comprising:

a spindle defining a spindle axis and having an outer end, said spindle provided with an annular groove formed in an outer surface thereof adjacent said outer end;

a wheel hub adapted to be supported and connected to said spindle for rotation therewith;

a steering knuckle;

a bearing assembly adapted to be secured to said steering knuckle so as to rotatably support said spindle and said wheel hub relative thereto; and a non-threaded bearing and wheel hub retention means disposed in said groove of said spindle for securing said spindle and wheel hub together and also for preloading said bearing assembly.

* * * * *